United States Patent [19]

DeWald

[11] Patent Number: 4,520,994
[45] Date of Patent: * Jun. 4, 1985

[54] SUB-SURFACE SAFETY GATE VALVE

[76] Inventor: Jack J. DeWald, 7323 W. Roadway, New Orleans, La. 70124

[ * ] Notice: The portion of the term of this patent subsequent to Jul. 12, 2000 has been disclaimed.

[21] Appl. No.: 511,459

[22] Filed: Jul. 7, 1983

Related U.S. Application Data

[62] Division of Ser. No. 61,076, Jul. 26, 1979, Pat. No. 4,392,631.

[51] Int. Cl.³ .............................................. F16K 31/16
[52] U.S. Cl. ........................................ 251/58; 74/110; 74/422; 92/136; 92/138; 166/321; 166/332
[58] Field of Search ................... 251/58; 74/110, 422; 92/136, 138; 166/321, 332

[56] References Cited

U.S. PATENT DOCUMENTS

| | | | |
|---|---|---|---|
| 2,663,459 | 12/1953 | Lagrange et al. | 251/58 X |
| 2,954,703 | 10/1960 | Morrell | 74/422 |
| 3,338,140 | 8/1967 | Sheesley | 251/58 X |
| 3,765,642 | 10/1973 | Nelson | 251/327 X |
| 3,965,801 | 6/1976 | Hutchins | 251/58 X |
| 4,187,876 | 2/1980 | Lang | 251/58 X |

FOREIGN PATENT DOCUMENTS

| | | | |
|---|---|---|---|
| 792628 | 10/1935 | France | 251/58 |
| 2253972 | 12/1973 | France | 251/58 |

Primary Examiner—Arnold Rosenthal
Attorney, Agent, or Firm—Charles C. Garvey

[57] ABSTRACT

A high pressure gate valve apparatus provides an elongated cylindrical valve body providing a fluid conveying linear cylindrical longitudinal bore of substantially uniform configuration. A gate valving member is movable within the valve body entirely within the confines of the valve body and not projecting laterally therebeyond. The valve member is movable at generally right angles to and intersecting the fluid conveying bore with the gate valving member providing a flow opening therethrough, the valving member being movable within the valve body between open flow and closed flow positions. A pair of spaced generally parallel cylindrical drive chamber is provided on the valve body substantially parallel to the central flow conveying bore. A pair of power receptive cylindrical operator shafts are slideably movable within the pair of drive chambers respectively with each shaft having valve pistons at its end portions adapted to move the shafts responsive to the introduction of hydraulic fluid into the drive chambers. A pair of gear structures associated respectively with and engagedly driven respectively by the pair of operator shafts engages both the shafts and the valving member for moving the valve member in its lateral path between open flow and closed flow positions. An attachment is provided for providing hydraulic power to the valve body and therethrough to the end portions of the drive chambers, whereby the operator shafts can be singly or doubly powered by hydraulic fluid.

10 Claims, 7 Drawing Figures

SUB-SURFACE SAFETY GATE VALVE

This is a division of application Ser. No. 61,076, filed July 26, 1979, entitled "Sub-Surface Safety Gate Valve," which application is now U.S. Pat. No. 4,392,631.

BACKGROUND OF THE INVENTION

1. Field of the Invention

The present invention relates to high pressure gate valves. The present invention more particularly relates to high pressure gate valves for use with for example, oil or gas well completion operations.

2. General Background and Prior Art

In the completion of testing oil and gas wells, there is a significant danger of the escape of oil and/or gas from the well structure before the well is finally completed and piping set up. During this time, it is necessary that the well be properly valved at the well opening. Such a completion valve must handle high pressures such as, for example, 15,000–20,000 p.s.i.

Many times a well is provided with a blow-out preventor (b.o.p.), also referred to as a "b.o.p." stack. The blow-out preventor or "b.o.p." stack is used on the well and is provided with closures which are called rams, which when activated can shut off the well in the event of a blow-out. The rams have sufficient strength to shear pipe, or other material which is in the well bore. Thus, the placement of equipment in the blow-out preventor stack does not negate the chance for closure. However, it would be desirable to have the safety factor of a primary valving system which would attach to the wellhead, yet be small enough to fit into the "b.o.p." stack and still be able to withstand, for example, 15,000–20,000 p.s.i. pressures as can be generated by the well at the wellhead.

In offshore well completion, a ship, or other mobile type drilling rig is employed usually in offshore well completion. In severe weather, the ship may be forced to break its connection with the well and return at a later time when seas have calmed. There is a need at this time for a valve structure preferably automatically when the ship either purposely or by accident breaks its connection with the oil well. It would be preferable that such a valve would fit inside the standard convention b.o.p. stack or blow-out preventors now on the market.

Valves which have attempted to solve the problem of offshore well completion, or sub surface use are generally faced with a size and pressure problem. Valves which are strong enough to withstand high pressures, must be manufactured generally of a size and configuration as to be unsuitable for placement within a b.o.p. stack or within casing.

Ball valves have been used, but have been less than satisfactory because of a warping problem with the valve when subjected to high pressures. The ball portion of the valve becomes somewhat "egg" shaped when subjected to high pressures, as the intense pressure tries to flatten the ball, thus producing the egg shape or lopsided warping of the valve ball portion. It will be appreciated that such warping removes the capacity of a valve to properly operate since it will no longer seat in a true fashion within the valve body.

Gate valves would be more suitable for a high pressure environment, but gate valves generally require a large configuration with the gate member of the valve (i.e. the actual valving member) projecting a distance laterally beyond the body of the valve. Such a configuration is unsuitable for placement in confined cylindrical or like openings such as within the casing or b.o.p. stack of an oil or gas well. Indeed, some casing and b.o.p. stack structures have dimensional openings on the order of $13\frac{1}{2}$ to 14 inches in diameter. It would be desirable to have a gate valve which could fit within such a $13\frac{1}{2}$ inch to 14 inch diameter, yet provide a desirable gate valve to combat the warping problem of ball valves, yet still be structurally sound to produce working pressures on the order of 15,000 p.s.i. Still another requirement of such a valve would be to provide a bore of constant cylindrical shape having a two inch or three inch opening (while still maintaining the minimum overall body diameter of $13\frac{5}{8}$ inches, for example), the valve bore allowing wire line tools and conductor line tools to be run down the well hole and through the valve bore. It would also be desirable to have a gate valve type valving member to produce a shear which could cut wire lines or conductor lines in the event that it would be desirable to close the valve quickly before the wire line or conductor lines could be removed. Such a shearing would be available with a powered gate valve construction.

Valves for use in such an environment should have a simple construction, with preferably interchangeability of parts as much as possible.

Often, it is necessary to operate a valve from within the valve bore or from outside the valve body where the valve operative source (such as hydraulic pressure) has been lost. This would be referred to as "annular" sensitive (outside operation) and "surface" sensitive (inside operation). It would be desirable that the valve could be operated by injecting pressure into the valve bore in order to open the valve when it is closed. In a like manner, it would be desirable to inject pressure about the outside body portion of the valve and allow it to be opened when closed and when normal connections to the valve are inoperative.

GENERAL BACKGROUND OF THE INVENTION

The present invention solves the prior art problems and shortcomings in a simple, yet sound manner. The present invention provides a valve structure of the gate type suitable for use in valving for example oil and gas wells, in a sub surface, completion, or sub sea situation. The present invention provides a high pressure gate valve structure which can operate within b.o.p. stacks and within drill casing having diameter as small as, for example $15\frac{5}{8}$ inch diameter, yet still maintain working pressures on the order of 15,000 p.s.i. and test pressure on the order of 22,500 lbs.

The present invention provides a high pressure gate valve having a cylindrical valve body providing a cylindrical flow conveying bore. A valve gate movable within the valve body between open flow and close flow positions operates completely within the cylindrical valve body not projecting laterally beyond the confines of the valve diameter. The gate valve providing a pair of toothed racks adapted to driveably engage with a provided gear structure. The gear structure is rotatably mounted within the valve body and provides driving force for operating the valve gate between open flow and closed flow positions. A pair of operator shafts movable within hydraulic pressure chambers in the valve body or slideably operated by hydraulic pressure and drivingly engage with and rotate the gear structure.

The operator shafts being approximately perpendicular to the valve gate member. Drive pistons are provided at each end portion of the operator shafts and receive hydraulic operating pressure and transmit such driving force to the operator shafts and thence to the gear structure which in turn rotates to operate the valve gate. Hydraulic attachment is provided on the valve body for attaching a controlled hydraulic pressure source to the valve body for operating the drive pistons and operator shafts.

Thus, it is an object of the present invention to provide a high pressure gate valve having a reduced cylindrical shape adapted for placement within drill casing, and within b.o.p. stacks.

It is another object of the present invention to provide a high pressure gate valve wherein the gate valving member operates between open flow and closed flow positions entirely within the confines of the cylindrical valve body.

It is another object of the present invention to provide a gate valve structure having a uniform cylindrical linear bore adapted to receive wire line and conductor line tools through the valve body during well operation.

Still another object of the present invention is to provide a valve which is both annular and surface sensitive, being operable from within the valve bore and from without the valve body.

It is another object of the present invention to provide a valve construction which is operable by hydraulic pressure and which is manually operative as well.

It is another object of the present invention to provide a gate valve apparatus which utilizes a plurality of interchangeable parts.

It is another object of the present invention to provide a gate valve apparatus allowing easy access to movable working parts for quick and easy inspection and/or repair.

It is another object of the present invention to provide a gate valve construction having dual operator drive shafts for balanced operative movement of the valve gate between open flow and closed flow positions.

It is another object of the present invention to provide a gate valve operated by linearly travelling operator shafts which are round, allowing packing off to prevent pressure leaks.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
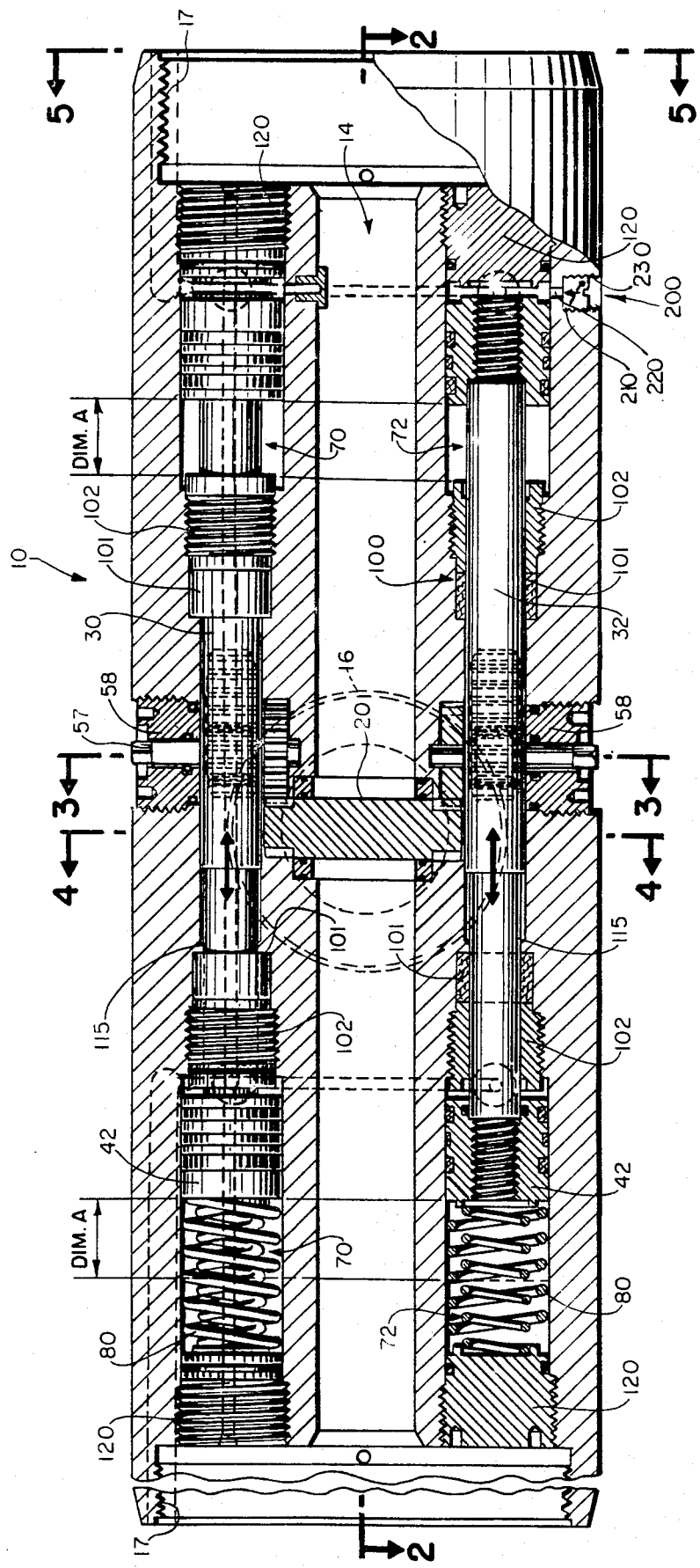
FIG. 1 is a partial sectional view of the preferred embodiment of the apparatus of the present invention.
Figure 2:
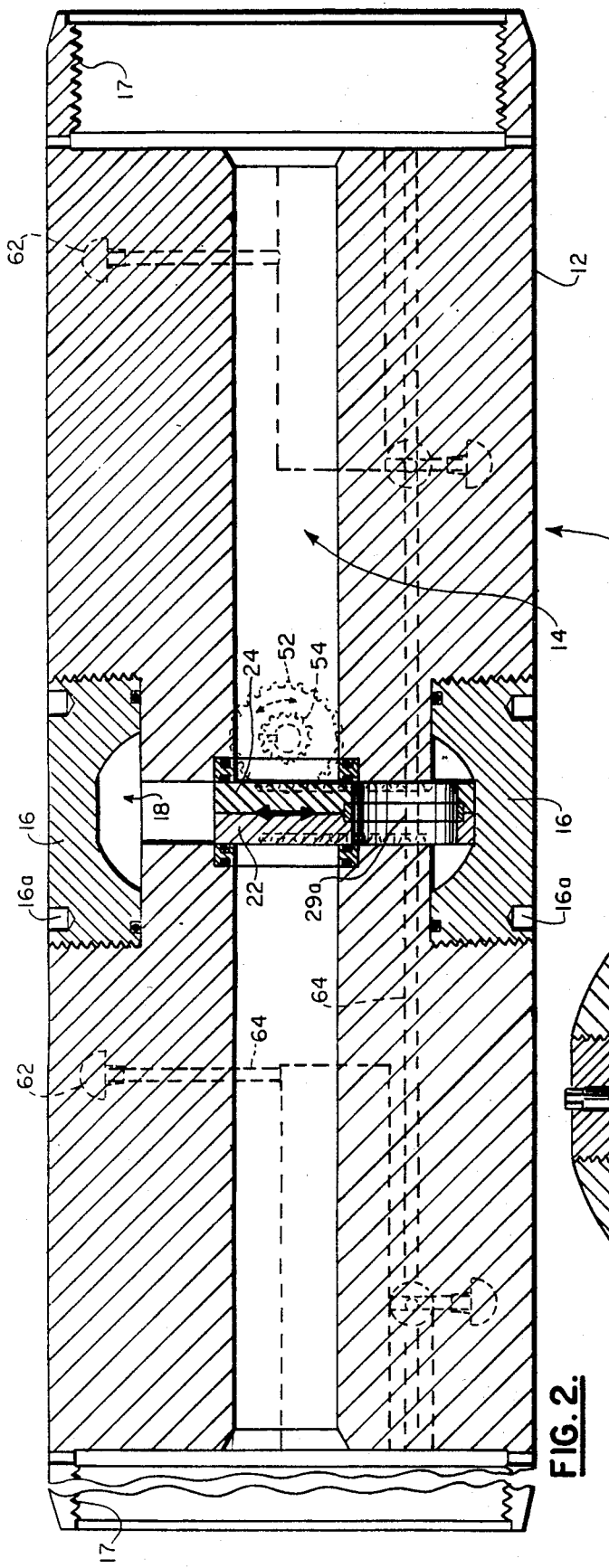
FIG. 2 is a sectional view of the preferred embodiment of the apparatus of the present invention, taken along lines 2—2 of FIG. 1.
Figure 7:
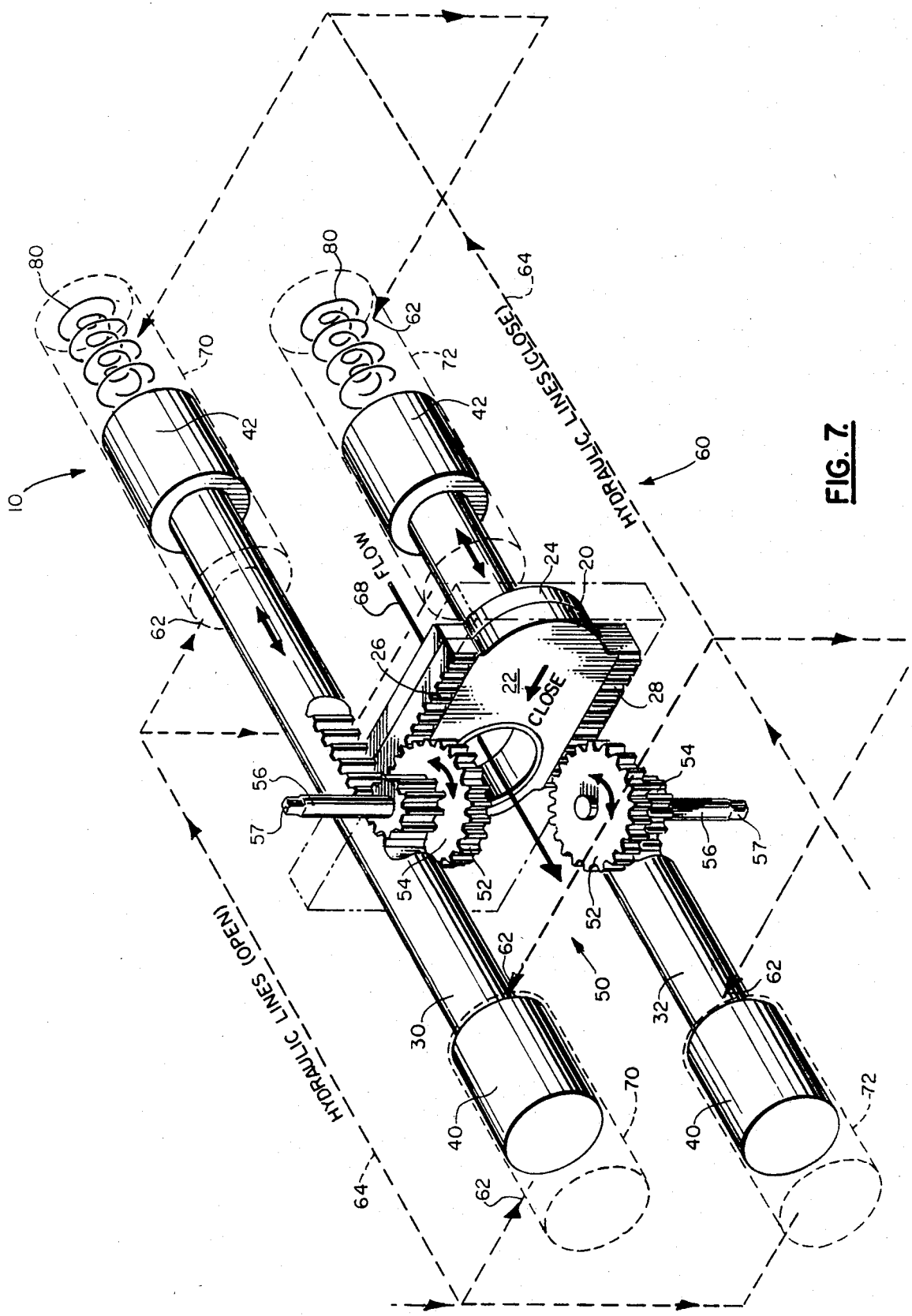
FIG. 7 is a schematic perspective view, of the preferred embodiment of the apparatus of the present invention, illustrating the operator shafts, pistons, gear structures, and valve gate.

FIGS. 1-2 and 7 best illustrate the preferred embodiment of the valve apparatus of the present invention designated generally by the numeral 10 in FIGS. 1, 2, and 7.

Valve 10 provides a cylindrical valve body 12 having an inner uniform flow conveying bore 14 which is preferably cylindrical and linear.

Figure 3:
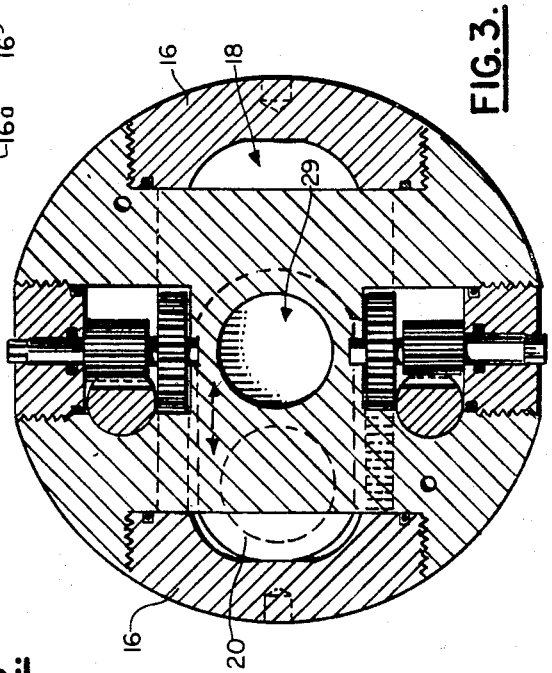
FIG. 3 is a sectional view taken along lines 3—3 of FIG. 1.
Figure 4:
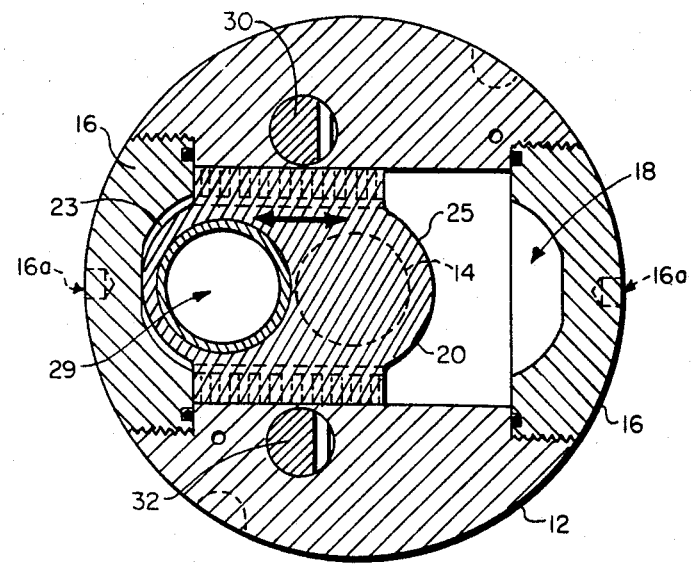
FIG. 4 is a sectional view taken along lines 4—4 of FIG. 1.
Figure 5:
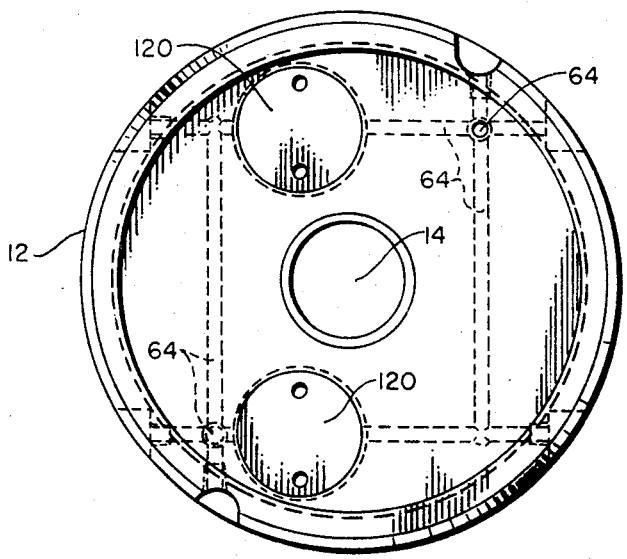
FIG. 5 is a sectional view taken along lines 5—5 of FIG. 1.

A valve gate member 20 is movably mounted within the valve body 12 between open flow and closed flow positions (see FIGS. 3-4). Valve gate 20 is operable by a gear structure 50, which is comprised generally of a pair of gate gears 52 and shaft gears 54 mounted on common gear shafts 56. Shafts 56 attach at the ends thereof to body 12 with the outermost portions adjacent the outer surface of valve body 12 being tooled (such as square or hex shaped) to receive manual driving force. The tooled end portions of shafts 56 are indicated as 57 in the drawings (FIGS. 3 and 7). Indicia could be marked on ends 57 and valve body 56 to indicate the particular degree or percentage of opening of valve gate 20 at or between open and closed flow positions. Gear structure 50 is rotatably mounted within the valve body 12 and engagedly attaches to the valve gate member at the toothed rack 26, 28 portions thereof to operate the gate 20 between open flow and closed flow positions.

A pair of operator shafts 30, 32 (See FIGS. 6, 7) are carried by and movable within the valve body 12, each shaft 30, 32 engagedly rotating with gear structure 50, by engaging with the gate gear 52 portion thereof. In the preferred embodiment, two gate gears 52 are provided, each rigidly mounted upon gear shaft 56 and rotating therewith. Gear covers 58 allow access to gear structures 50.

A hydraulic system designated by the numeral 60 is adapted for attachment to the valve body for attaching a controlled hydraulic pressure source to the valve body 12. Hydraulic system 60 at least in part, moves the operator shafts 30, 32 relative to valve body 12.

Each operator shaft 30, 32 is provided with its respective drive chamber 70, 72. Drive chambers 70, 72 are generally cylindrical in shape and provide generally cylindrical passages within valve body 12 for the linear bi-directional sliding movement of operator shafts 30, 32 therewithin. In FIG. 1, "DIM. A" indicates schematically the dimensional bi-directional linear sliding movement of shafts 30, 32 and pistons 40, 42 attached thereto.

Each operator shaft 30, 32 is equipped with drive pistons 40, 42 at the end portions thereof, The indroduction of hydraulic fluid through hydraulic system 60 into drive chamber 70, 72 applies driving force to pistons 40, 42 and thus to operator shafts 30, 32. As will be described more fully hereinafter operator shafts 30, 32 are unbalanced to bias the open-close movement of valve gate member 20 to a fail-safe closed position. Spring structures 80 also bias shafts 30, 32 and thus valve gate 20 to a fail-safe closed position.

FIG. 2 shows with particularity the structure of valve body 12. Note that valve body 12 is cylindrical, having a relatively constant uniform diameter and providing a uniform linear cylindrical bore 14. End attachments 17 can be for example any conventional type attachment such as a conventional threaded attachment or the like, adapting valve 10 for threaded or like attachment to any desired piping or casing arrangement. Access cover 16 are threadably for example attached to valve body 12 and are provided with o-rings or other sealing material as needed. Tool receptive openings 16a allow caps 16 to be removed by the placement of a suitable driving tool thereinto. A curved or semi-circular recess on access cap 16 faces inwardly toward gate member 20. Note from an inspection of FIGS. 3 and 4, that recess 18 allows movement of gate member 20 as close to caps 16 as possible to insure opening and closing movement of valve 20, yet still maintaining structural integrity of the valve and thus maintaining higher working pressures. In FIG. 4 the bi-directional arrow indicates the open flow/closed flow movement of valve gate member 20 in a lateral direction with respect to the bore 14 of valve 10. FIG. 2 also indicates by using a bi-directional arrow this sliding lateral movement of valve gate member 20 within body 12. Note from FIGS. 2 and 4 that valve gate 20 moves entirely within the confines of valve body 12. Note projection is seen beyond the diameter of valve body 12 as is desirable. Thus the overall valve body is a clean neat cylindrical shape which easily allows valve body 12 to be placed within b.o.p. stacks, valve casing, and the like. As is the case with prior art type gate valves, there is no projection laterally beyond the valve body. In FIG. 2 there can be seen a plurality of hydraulic fluid conveying lines 64 which are seen in phantom lines. Lines 64 as will be described more fully hereinafter, provide hydraulic fluid through valve body 12 to drive chambers 70, 72. It will be appreciated that hydraulic lines 64 can be provided to each end portion of drive chambers 70, 72 so as to singularly or doubly drive operator shafts 30, 32.

FIGS. 3, 4, and 7 show with particularity the structure of valve gate member 20. Valve gate 20 is comprised of a pair of gate halves 22, 24 with a flow opening 29 being provided therethrough. Flow opening seat 29a is provided at opening 29 as can be seen best in FIG. 2. Gate 20 is generally rectangular having semicircular end portions 23, 25 and providing toothed racks 26, 28 at the side portions of gate 20, which racks 26, 28 are generally parallel to the direction of movement of gate 20. Open 23 and close 25 end portions are provided to valve gate 20, which end portions are generally semicircular in shape and adapted to register into recess 18 of caps 16. The semicircular ends 23, 25 of gate 20 are desirable to give the necessary strength of gate 20 about opening 23 while minimizing dimensional or space requirements.

Figure 6:
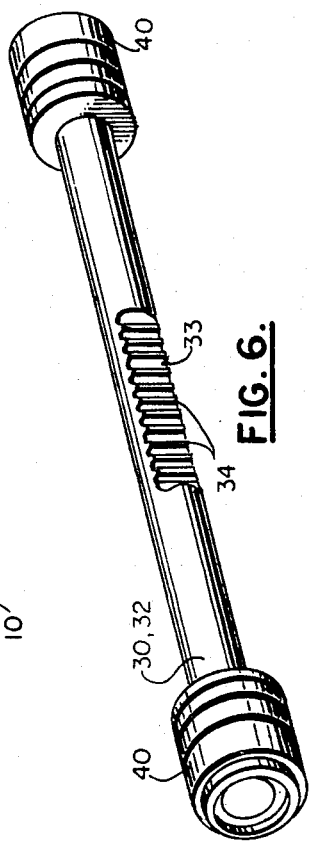
FIG. 6 is a perspective view of the operator shaft and piston portions of the preferred embodiment of the apparatus of the present invention.

A pair of operator shafts 30, 32 are best seen in FIGS. 6 and 7. Shafts 30, 32 are generally cylindrical allowing shafts 30, 32 to be packed off to prevent pressure leaks. A toothed rack 33 structure on shafts 30, 32 is comprised of a plurality of individual gear teeth 34, which are equally spaced to correspond with and engage the teeth on shaft gears 54.

The end portions of each operator shaft 30, 32 are equipped with drive pistons 40, 42 which can be for example threadably mounted thereon (See FIG. 1). Each piston 40, 42 is generally cylindrical and adapted to slideably travel within drive chamber 70, 72 when hydraulic fluid is forced thereinto.

Hydraulic system 60 provides inlet ports 62 for the introduction or discharge of hydraulic fluid from hydraulic system 60 through lines 64 into ports 62 and drive chambers 70, 72. It should be understood that ports 62 vent drive chamber 70, 72 behind drive pistons 40, 42 and away from gate 20. It can be seen by one skilled in the art that the introduction of hydraulic fluid through ports 62 at one end portion of valve 10 can slideably move shafts 30, 32 in one direction while introduction of hydraulic pressurized fluid through inlet ports 62 at the opposite end portion of shafts 30, 32 will slideably move operator shafts 30, 32 to a closed position. Hydraulic fluid introduced into drive chamber 70, 72 acts upon the respective pistons 40, 42 to urge the piston and its attached shaft slideably along end drive chambers 70, 72. Hydraulic fluid as introduced will not leak as packing assemblies 100 are provided to pistons 40, 42 and drive chambers 70, 72 are not otherwise vented on the outer extreme sides of pistons 40, 42 away from shafts 30, 32. Packing assemblies 100 are best seen in FIG. 1 and are comprised generally of packing material 101 and packing gland nut 102. Nut 102 would be threadably engaged into body 12 as is seen in FIG. 1 with sectional and perspective views being provided in that Figure. Packing material 101 would be for example a teflon type packing such as "jic chevron, style E" type teflon packing. Since shafts 30, 32 are cylindrical a packing off in this manner is allowed. In FIG. 7, flow arrow 68 indicates generally the direction of fluid flow through bore 14. Further, arrows 69 indicate the movement of shafts 40, 42 to a closed valve position.

FIG. 1 and 7 illustrate spring structures 80. Spring structures 80 are provided at the end portions of drive chamber 70, 72 behind pistons 42. The placement of springs 80 in this manner biases movement of shafts 30, 32 in the direction of arrow 68 to a closed valve position. Thus, a fail-safe closure of valve structure 10 is achieved. Additionally, a biasing of valve 10 to a closed flow position is provided by varying diameters to shafts 30, 32 have a smaller cross-sectional size at 115 in FIG. 1.

Normally, well pressure which would leak into drive chamber 70, 72 in the space adjacent each shaft 30, 32, and would act on shafts 30, 32 of varying diameter to bias shafts movement toward closed flow positions.

End caps 120 allow access to drive chambers 70, 72 and pistons 40, 42. Caps 120 (4 required) are interchangeable as are pistons 40, 42. Other parts of valve 10 are desirably interchangeable. These include the pair of spring structures 80; the pair of shafts 30, 32; the pair of gear structures 50; the pair of covers 16; and the pair of gear inspection covers 58.

It would be preferred that valve 10 could be operated from outside of valve body 12 and from within through bore 14. In the art, this is referred to as annular sensitive (i.e. operative from outside housing 12) and surface sensitive (i.e. operative from within bore 14).

In FIG. 1, there can be seen the details of construction which enable valve 10 to be operated from within bore 12, making valve 10 "surface" sensitive. Further, there can be seen the details of construction in FIG. 1 which allow valve 10 to be operated from without or "annular" sensitive.

In FIG. 1 an outer recess 200 is provided which can be threaded, for example to receive threadably a check valve 210 which is schematically shown in FIG. 1. A port 220 communicates with drive chamber 70, 72. It will be appreciated that if pressure is applied to the outside of body 12, check valve 210 would allow fluid flow into port 220 and drive chambers 70, 72. The arrow 230 in FIG. 1 indicates this uni-directional check valve flow.

It will be appreciated that such outside pressure could be easily injected into for example a section of casing, or into a b.o.p. stack or the like. Check valves 210 as above described could be provided with all four drive chambers 70, 72 if desired or two check valves 210 could be so supplied if single action rather than double action were desired.

Surface operation, or operation from within the bore 14 can be achieved by means of a "target" or "shifting tool". Such devices are known in the art and could be lowered into bore 14 from the well surface. In FIG. 1 there can be seen a plug 300 which would be for example easily sheared and which would clog and is placed within port 310. When the "target" were lowered, it would abut plug 300 and shear it off, creating a communication between bore 14 and drive chambers 70, 72. It would be appreciated that a plurality of plugs 300 and ports 310 could be provided as desired with each drive chamber 70, 72. Placement of such devices within the above teaching would be a matter of choice.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A gate valve apparatus, comprising:
   a. an elongated generally cylindrical valve body providing a longitudinally running flow conveying bore;
   b. a valve gate movable within the confines of the valve body between open flow and closed flow positions and including at least one gear receptive toothed rack;
   c. gear structure means rotatably mounted within the valve body for engagedly moving the toothed rack of the valve gate between the open flow and the closed flow positions;
   d. operator shaft means carried by and movable within the confines of the elongated valve body for engagedly rotating the gear structure means; and
   e. hydraulic attachment means on the valve body for attaching a controlled hydraulic pressure source to the valve body for moving the operator shaft means relative to the valve body.

2. The gate valve of claim 1, wherein the gear structure provides at least one shaft gear cooperatively engaged with the toothed rack of the valve gate.

3. The gate valve of claim 1, wherein the valve gate is provided with a fluid conveying opening, the opening communicating with the flow conveying bore when the valve gate is in the open flow position.

4. The gate valve of claim 1, further comprising valve seat means associated with the valve body and the valve gate for forming a substantially fluid tight seal between the valve body and the valve gate.

5. The gate valve of claim 1, wherein the operator shaft means comprises at least one elongated shaft having drive pistons at its end portions.

6. The gate valve of claim 1, wherein the operator shaft means comprises a pair of operator shaft members, the operator shafts being mounted generally perpendicular to the valve gate and moving during operation in a parallel coincident manner.

7. The gate valve of claim 1, wherein the operator shaft means includes one or more drive pistons for transferring hydraulic pressure from the hydraulic attachment means to the gear structure means.

8. The gate valve of claim 1, wherein the hydraulic attachment means is at least one port on the valve body, the port communicating with a provided inner hydraulic system, the system providing at least one hydraulic line communicating in part with the operator shaft means.

9. The gate valve of claim 1, whrein the valve body is of a generally uniform cylindrical cross-section and the operator shaft means is generally longitudinally positioned in the valve body so that it moves transversely with respect to the valve gate during opening or closing of the valve bore.

10. A gate valve apparatus, comprising:
   a. an elongated generally cylindrical valve body providing a longitudinally running flow conveying bore having an axis that is generally coincident with the central longitudinal axis of the valve body;
   b. a valve gate movable within the confines of the valve body and transversely with respect to the bore between open flow and closed flow positions and including at least one gear receptive toothed rack;
   c. gear structure means rotatably mounted within the valve body for engagedly moving the toothed rack of the valve gate between the open flow and the closed flow positions;
   d. at least one elongated operator shaft carried within the confines of the elongated valve body and positioned generally parallel to the bore for engagedly rotating the gear structure means responsive to movement of the shaft along a longitudinal line that is generally parallel to the bore; and
   e. hydraulic attachment means on the valve body for attaching a controlled hydraulic pressure source to the valve body for moving the operator shaft relative to the valve body so that the operator shaft can be powered to open and close the gate.

* * * * *